(12) United States Patent
Marotta et al.

(10) Patent No.: US 8,861,145 B2
(45) Date of Patent: Oct. 14, 2014

(54) CIRCUIT WITH MOTOR DRIVER SPIKE SUPPRESSION

(75) Inventors: Joseph Marotta, Boonton, NJ (US);
Dale Trumbo, Tucson, AZ (US);
Nasrullah Habeeb M, Kerala (IN);
Rajamohan Revindranathan,
Morristown, NJ (US)

(73) Assignee: Honeywell International Inc.,
Morristown, NJ (US)

( * ) Notice: Subject to any disclaimer, the term of this patent is extended or adjusted under 35 U.S.C. 154(b) by 106 days.

(21) Appl. No.: 13/553,512

(22) Filed: Jul. 19, 2012

(65) Prior Publication Data

US 2014/0022676 A1   Jan. 23, 2014

(51) Int. Cl.
*H02H 7/09* (2006.01)
*H02H 5/04* (2006.01)

(52) U.S. Cl.
USPC .............................................. 361/33; 361/23

(58) Field of Classification Search
USPC ...................................................... 361/33, 23
See application file for complete search history.

(56) References Cited

U.S. PATENT DOCUMENTS

| 5,018,041 | A | | 5/1991 | Szepesi | |
| 5,408,150 | A | * | 4/1995 | Wilcox | ........................ 327/108 |
| 7,449,947 | B2 | | 11/2008 | Unnikrishnan et al. | |
| 7,579,669 | B2 | * | 8/2009 | Nakamura et al. | ............ 257/499 |
| 7,660,094 | B2 | * | 2/2010 | Urakabe et al. | ............... 361/118 |
| 7,667,988 | B2 | | 2/2010 | Haeberle et al. | |
| 7,714,562 | B2 | | 5/2010 | Oswald et al. | |
| 7,741,896 | B2 | | 6/2010 | Chow et al. | |
| 7,928,597 | B2 | | 4/2011 | Gupta et al. | |
| 2006/0119390 | A1 | * | 6/2006 | Sutardja | .......................... 326/62 |
| 2008/0297956 | A1 | * | 12/2008 | Van Zundert et al. | ............ 361/1 |
| 2011/0148368 | A1 | | 6/2011 | Burns et al. | |

OTHER PUBLICATIONS

Hanigovski, et al., A novel output filter topology to reduce motor overvoltage, IEEE Transactions on Industry Applications, May/Jun. 2004, pp. 845-852, IEEE.

Kim et al., An active gate drive circuit for high power inverter system to reduce turn-off spike voltage of IGBT, Oct. 2007, pp. 127-131, IEEE.

* cited by examiner

*Primary Examiner* — Eduardo Colon Santana
*Assistant Examiner* — Gabriel Agared
(74) *Attorney, Agent, or Firm* — Shimokaji & Assoc., P.C.

(57) ABSTRACT

A suppression circuit may be added to a motor driver circuit, which suppresses offset voltage and ringing in the output signal. The suppression circuit may include an RC circuit filter connected to a pin of a microchip providing a gating reference signal and a junction between high and low side MOSFETS connected to the microchip.

7 Claims, 5 Drawing Sheets

CIRCUIT WITH MOTOR DRIVER SPIKE SUPPRESSION

BACKGROUND OF THE INVENTION

The present invention generally relates to motor drivers and more particularly, a circuit with motor driver spike suppression.

Motor driver integrated circuits typically have an absolute maximum rating limit for the spike between ground and the output switching node to a voltage between −2V and −5V. Spiking may be generated by gate drive inductance and high dv/dt gate drive.

One approach to reduce spike levels is to place MOSFETS close to the driver which reduces the gate drive inductance. Referring to FIG. 1, a motor driver circuit 100 is shown. The circuit 100 shows a microchip 110 supplying high side gating (TG) and low side gating (BG) signals to a high side MOSFET 120 and a low side MOSFET 130. However, mechanical restrictions on MOSFET locations may require the MOSFETS to be separated from the driver. For example, MOSFETs 120 and 130 may need to be distanced from the driver because of thermal restrictions. The separation of MOSFETs from the driver may cause the gate drive distance to increase to a length that will cause a spike that exceeds the driver part ratings. Referring to FIG. 2, an example measurement of high side floating offset voltage output from the circuit 100 is shown. The minimum value of undershoot from this measurement is approximately negative 7.2 volts.

As can be seen, there is a need for a motor driving circuit that can employ MOSFETs while suppressing spiking levels.

SUMMARY OF THE INVENTION

In one aspect of the present invention, a motor driver circuit with motor driver spike suppression comprises a microchip; a high side MOSFET, wherein a high side gate driver output of the microchip is connected to a gate of the high side MOSFET; a low side MOSFET, wherein a low side gate driver output of the microchip is connected to a gate of the low side MOSFET; and a resistor-capacitor (RC) circuit connected to a high side MOSFET source pin of the microchip and to a junction of source of the high side MOSFET and drain of the low side MOSFET.

In another aspect of the present invention, a motor driver circuit with motor driver spike suppression comprises a microchip; a high side MOSFET, wherein a high side gate driver output of the microchip is connected to a gate of the high side MOSFET; a first passive component is between the high side gate driver output of the microchip and the gate of the high side MOSFET; a low side MOSFET, wherein a low side gate driver output of the microchip is connected to a gate of the low side MOSFET; a second passive component is between the low side gate driver output of the microchip and the gate of the low side MOSFET; and a ferrite bead-capacitor circuit connected to a high side MOSFET source pin of the microchip and to a junction of source of the high side MOSFET and drain of the low side MOSFET.

In yet another aspect of the present invention, a method of filtering driver spikes in a motor driver circuit comprises providing a first gating signal from a microchip to a high side MOSFET; providing a second gating signal from the microchip to a low side MOSFET; and providing a voltage from the junction of source of the high side MOSFET and drain of the low side MOSFET through a resistor-capacitor (RC) circuit connected to the high side source pin of the micro chip.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides spike suppression in a motor driver circuit. In one aspect, spiking in the offset voltage can be controlled to within operational parameters by providing, for example, a high frequency filter in the $V_s$ line (high side gate reference signal) returning to the MOSFET driver to suppress ringing and undershoot. The filter frequency can be set to allow the normal switching waveform to pass through un-attenuated. The filter implementation can be in many forms, but in general a passive implementation may be employed. For example, higher order multi-stage filters can be employed to improve performance at the expense of increased parts count, however, for sake of illustration, a minimal form of filter is disclosed.

Figure 1:
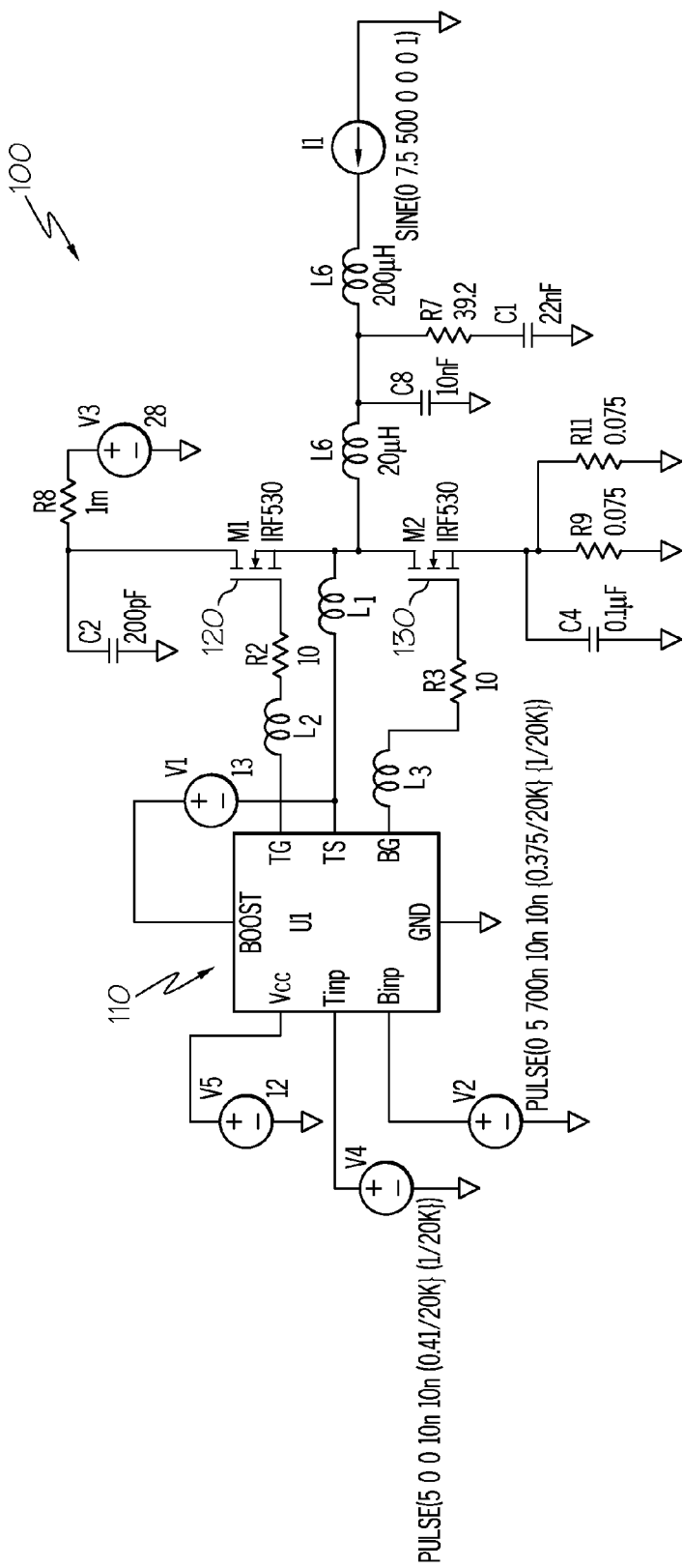
FIG. 1 is a schematic of a motor driver circuit according to the prior art.
Figure 2:
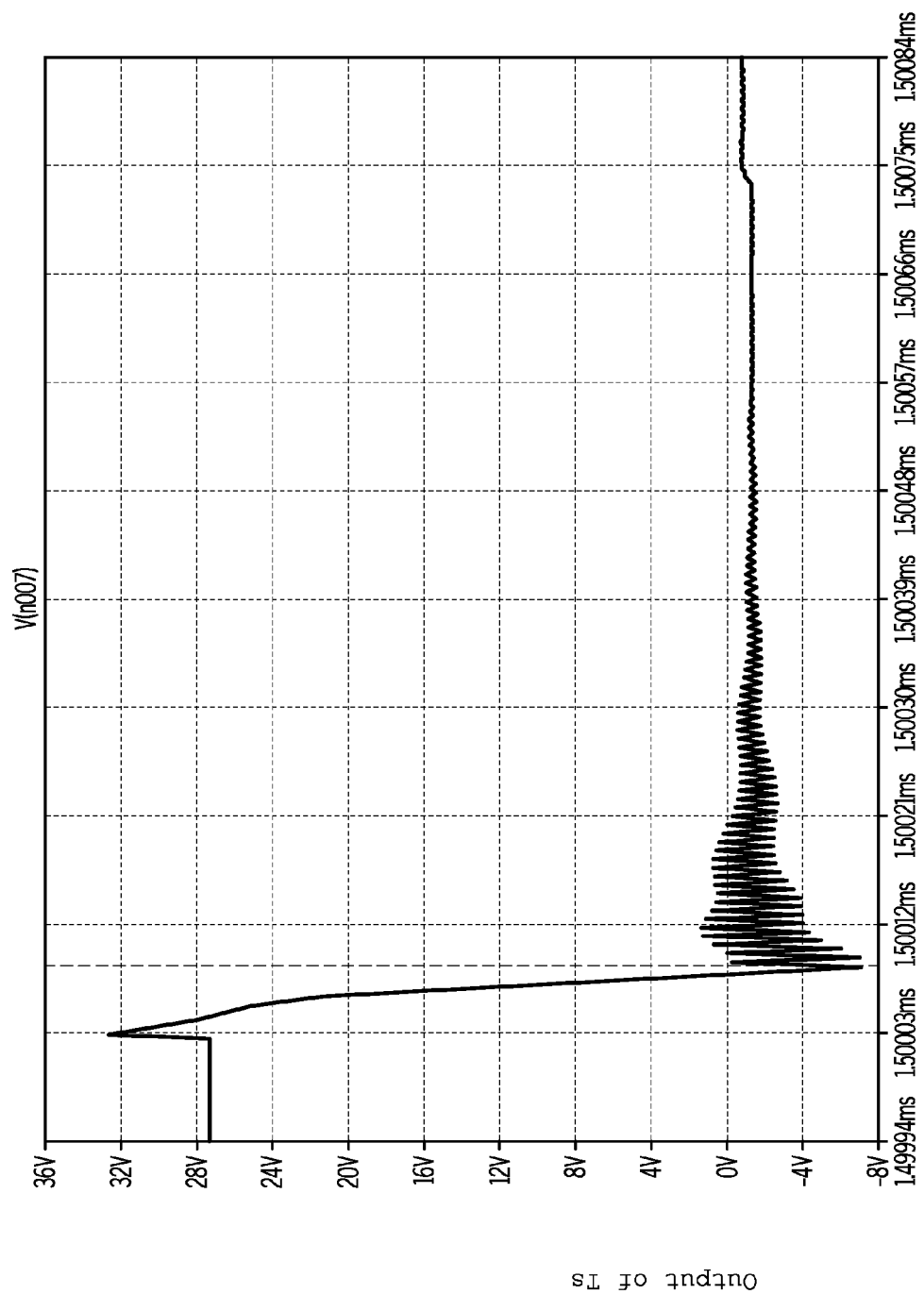
FIG. 2 is a chart showing a voltage measurement output of the circuit of FIG. 1.
Figure 3:
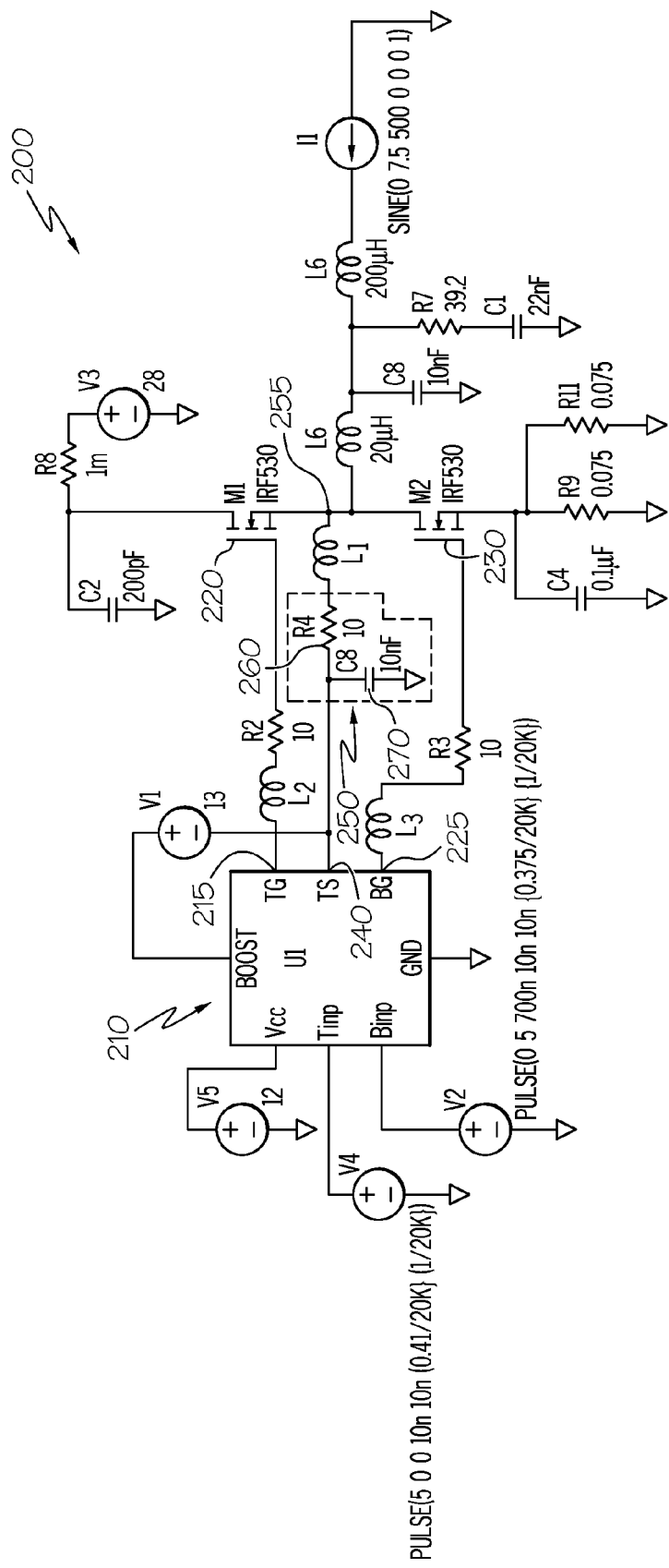
FIG. 3 is a schematic of a motor driver circuit according to an exemplary embodiment of the present invention.

Referring now to FIG. 3, a motor driver circuit 200 is shown according to an exemplary embodiment of the present invention. The circuit 200 may include a microchip or microprocessor 210, a high side MOSFET 220, a low side MOSFET 230, and a suppression circuit 250. The microchip 210 may be configured to provide a 3 phase motor drive. The microchip 210 may be powered by a floating power source. The high side MOSFET 220 may be connected to a high side gating driver output pin 215 of the microchip 210. The low side MOSFET 230 may be connected to a low side gating driver output pin 225 of the microchip 210. The suppression circuit 250 may have an input side connected to a high side source pin 240 (providing a gate reference signal) of the microchip 210.

In an exemplary embodiment, the suppression circuit 250 may be a resistor-capacitor (RC) filter. The RC filter circuit may include a resistor 260 and a capacitor 270. The output side of the suppression circuit 250 may be connected to a junction 255 between the source of the high side MOSFET 220 and the drain of the low side MOSFET 230. In another exemplary embodiment, the resistor 260 may be substituted with a ferrite bead.

In one aspect, the high side MOSFET 220 and the low side MOSFET 230 may be separated from the microchip 210 driver outputs (215; 225; 240). The thermal separation of MOSFETS 220 and 230 from the microchip 210 may result in an undesirably long trace length. As the distance of separation of MOSFETS 220 and 230 from microchip 210 increases, the inductance along the trace associated with each of the microchip 210 driver outputs (215; 225; 240) may increase. For example, a trace inductance along each of the trace lines connected to driver outputs 215, 225, 240 may be represented as L2, L3, and L1. As a result of thermal separation of MOSFETS 220 and 230 from the microchip 210, L1, L2, and L3 may exhibit parasitic qualities causing undesirable voltage output.

Figure 4:
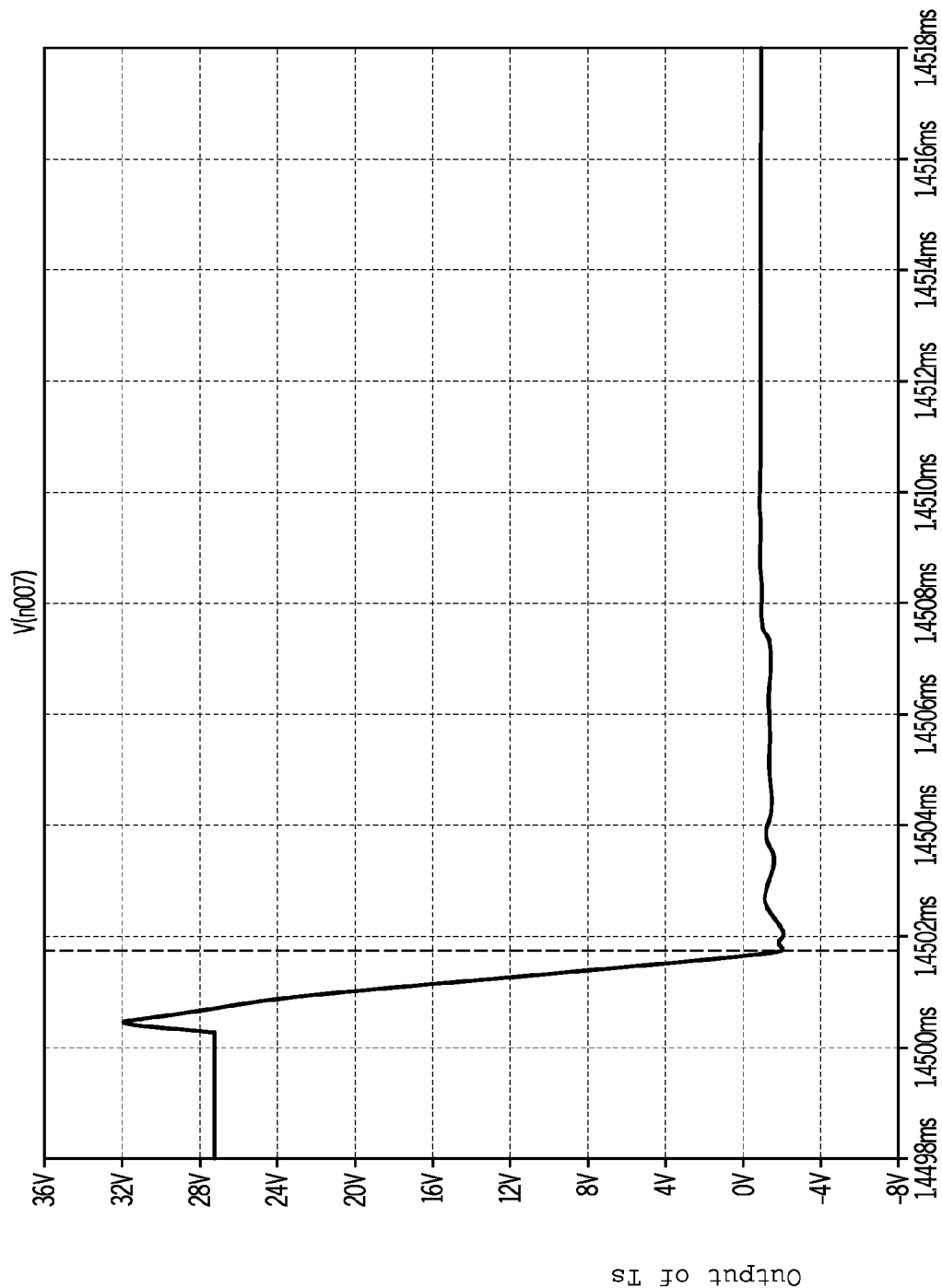
FIG. 4 is a chart showing a voltage measurement output of the circuit of FIG. 3.

Referring now to FIGS. 3 and 4 concurrently, it may be appreciated that the suppression circuit 250 positioned between the driver output 240 and the junction 255 attenuates ringing in the output signal 410 while allowing the MOSFETS 220 and 230 to be spaced far enough from the microchip 210 to reduce the offset voltage to, for example, approximately negative 2 volts.

Figure 5:
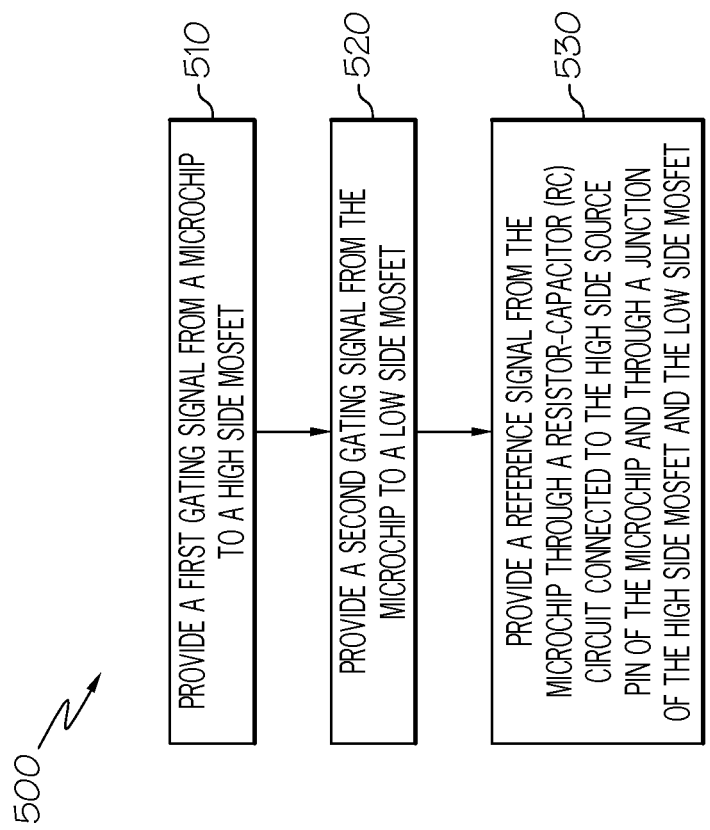
FIG. 5 is a flowchart illustrating a series of steps according to another exemplary embodiment of the present invention.

Referring now to FIG. 5, a method 500 of filtering driver spikes in a motor driver circuit is shown in accordance with an exemplary embodiment of the present invention. In step 510, a first gating signal may be provided from a microchip 210 to a high side MOSFET 220. In step 520, a second gating signal may be provided from the microchip 210 to a low side MOSFET 230. In step 530, a voltage output may be provided from a high side source pin 240 of the microchip 210 through a resistor-capacitor (RC) circuit 250 connected to the high side source pin 240 of the microchip 210 and through a junction 255 of the high side MOSFET 220 and the low side MOSFET 230.

It should be understood, of course, that the foregoing relates to exemplary embodiments of the invention and that modifications may be made without departing from the spirit and scope of the invention as set forth in the following claims.

We claim:

1. A motor driver circuit with motor driver spike suppression, comprising:
   a microchip including a high side gate driver output, a low side gate driver output, and a high side source driver input;
   a high side MOSFET, wherein the high side gate driver output of the microchip is connected to a gate of the high side MOSFET;
   a low side MOSFET, wherein the low side gate driver output of the microchip is connected to a gate of the low side MOSFET; and
   a resistor-capacitor (RC) filter circuit including a driver signal input terminal and a driver signal output terminal, the driver signal input terminal connected to the high side source driver input of the microchip and the driver signal output terminal connected to a junction of source of the high side MOSFET and drain of the low side MOSFET.

2. The motor driver circuit with motor driver spike suppression of claim 1 wherein a ferrite bead is used in the RC filter circuit as a resistor.

3. The motor driver circuit with motor driver spike suppression of claim 1 wherein a passive component is between the RC filter circuit and the high side source driver input of the microchip.

4. A motor driver circuit with motor driver spike suppression, comprising:
   a microchip including a high side gate driver output, a low side gate driver output, and a high side source driver input;
   a high side MOSFET, wherein the high side gate driver output of the microchip is connected to a gate of the high side MOSFET;
   a first passive component is between the high side gate driver output of the microchip and the gate of the high side MOSFET;
   a low side MOSFET, wherein the low side gate driver output of the microchip is connected to a gate of the low side MOSFET;
   a second passive component is between the low side gate driver output of the microchip and the gate of the low side MOSFET; and
   a ferrite bead-capacitor filter circuit including a driver signal input terminal and a driver signal output terminal, the driver signal input terminal connected to the high side source driver input of the microchip and the driver signal output terminal connected to a junction of source of the high side MOSFET and drain of the low side MOSFET.

5. The motor driver circuit with motor driver spike suppression of claim 4 further comprising a third passive component between the ferrite bead-capacitor filter circuit and the high side source driver input of the microchip.

6. The motor driver circuit with motor driver spike suppression of claim 5 wherein the high side and low side MOSFETs are N-channel type MOSFETs.

7. A method of filtering driver spikes in a motor driver circuit, comprising:
   providing a first gating signal from a microchip to a high side MOSFET;
   providing a second gating signal from the microchip to a low side MOSFET; and
   providing a voltage output from a high side source driver input pin of the microchip, and filtering the voltage output through a resistor-capacitor (RC) circuit connected to a junction of source of the high side MOSFET and drain of the low side MOSFET.

* * * * *